United States Patent
Lem et al.

(10) Patent No.: US 10,391,913 B2
(45) Date of Patent: Aug. 27, 2019

(54) METHOD FOR DYNAMIC ADAPTATION OF LATERAL SUPPORT TO VEHICLE STATES IN MOTOR VEHICLE SEATS WITH A SEAT SURFACE AND WITH A BACKREST AND CORRESPONDING SEAT

(71) Applicant: Ford Global Technologies, LLC, Dearborn, MI (US)

(72) Inventors: Jeroen Lem, Maastricht (NL); Florian Golm, Herzogenrath (DE); Nikica Hennes, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 15/401,401

(22) Filed: Jan. 9, 2017

(65) Prior Publication Data
US 2017/0203675 A1  Jul. 20, 2017

(30) Foreign Application Priority Data
Jan. 15, 2016  (DE) .................... 10 2016 200 441

(51) Int. Cl.
*B60N 2/90* (2018.01)
*B60N 2/02* (2006.01)

(52) U.S. Cl.
CPC .......... *B60N 2/914* (2018.02); *B60N 2/0244* (2013.01); *B60N 2/99* (2018.02); *B60N 2002/0256* (2013.01); *B60N 2002/0268* (2013.01)

(58) Field of Classification Search
CPC ........ B60N 2/914; B60N 2/99; B60N 2/0244; B60N 2002/0256; B60N 2002/0268

USPC .......................................................... 701/36
See application file for complete search history.

(56) References Cited

U.S. PATENT DOCUMENTS

| | | | |
|---|---|---|---|
| 6,220,667 B1 * | 4/2001 | Wagner ................. | B60N 2/002 297/284.6 |
| 6,578,871 B2 * | 6/2003 | Gray ................ | B60R 21/01516 280/735 |
| 8,958,955 B2 | 2/2015 | Hotary et al. | |
| 2002/0134592 A1 * | 9/2002 | Gray ....................... | B60N 2/002 177/208 |
| 2012/0104812 A1 * | 5/2012 | Griffin .................. | B60N 2/002 297/217.1 |

FOREIGN PATENT DOCUMENTS

| | | |
|---|---|---|
| DE | 19545168 A1 | 6/1997 |
| DE | 19806535 A1 | 8/1998 |

(Continued)

OTHER PUBLICATIONS

German Patent and Trade Mark Office, Search Report for German Application No. DE 102016200441.7 dated Oct. 6, 2016.

*Primary Examiner* — Muhammad Shafi
(74) *Attorney, Agent, or Firm* — Vichit Chea; Price Heneveld LLP

(57) ABSTRACT

A method for adjusting a motor vehicle seat includes receiving pressure signals from pressure sensors disposed in a grid network on outside surfaces of edge bladders of the seat. The method further includes raising or lowering a fluid pressure within the edge bladders using the pressure signals, including lowering of the bladder pressure on the door side on recognizing an entry or exit situation only if a load-related pressure rise in bladders on the door side has occurred.

13 Claims, 2 Drawing Sheets

(56) References Cited

FOREIGN PATENT DOCUMENTS

| | | |
|---|---|---|
| DE | 19858209 C1 | 4/2000 |
| DE | 102005038289 B3 | 3/2007 |
| DE | 102007015419 A1 | 10/2008 |
| DE | 102007032448 A1 | 1/2009 |
| DE | 102013001772 A1 | 7/2014 |

* cited by examiner

METHOD FOR DYNAMIC ADAPTATION OF LATERAL SUPPORT TO VEHICLE STATES IN MOTOR VEHICLE SEATS WITH A SEAT SURFACE AND WITH A BACKREST AND CORRESPONDING SEAT

FIELD OF THE DISCLOSURE

The present disclosure generally relates to a method for the dynamic adaptation of lateral support to vehicle states in motor vehicle seats with a seat surface and with a backrest and a corresponding seat.

BACKGROUND OF THE DISCLOSURE

It is generally known to adjust seats of motor vehicles by hand or by means of actuators, wherein the lateral support is adjusted by upholstery parts in the lateral region.

For this purpose, it is known inter alia to fill fluid-filled bladders with a defined pressure. In this case, pressure sensors can be inserted into the bladders in order to measure the adjusted pressure and to be able to adapt the pressure to the user, in particular to his weight, anatomy and size. Said adjustments are carried out statically, i.e. set once and left until the user changes them. Alternatively, it is known to vary the pressure of the fluid-filled bladders in order to increase or ensure the well-being of the user.

DE 198 06 535 A1 thus discloses the use of pressure reshaping means within fluid-filled bladders in order to reduce the muscle fatigue of the occupant.

By contrast, DE 10 2007 015 419 A1 describes the use of pressure sensors in the seat to determine the weight of the occupant by comparing the pressures at different accelerations, and, by this means, to control the restraining systems and, possibly, to optimize comfort.

U.S. Pat. No. 8,958,955 B2 discloses the adjustment and adaptation of motor vehicle seats to occupants and besides this also the adjustment of fluid-filled bladders by means of carrying out pressure changes in order to maintain comfort. In doing so, vehicle states that are to be expected can also be taken into account during the adjustment and adaptation of motor vehicle seats using GPS data.

In vehicle seats the lateral support can also be adjusted by changing the lateral (edge) upholstery elements. Said changes can be carried out by adjusting the fluid-filled bladders for example.

DE 10 2007 032 448 A1 discloses a motor vehicle seat with side bolsters that can be varied by means of pneumatic bladders. In this case, the bladders on the door side can be evacuated if the corresponding door is opened and/or the ignition is switched off.

DE 10 2013 001 772 A1 discloses a flexible surface cover for furnishing a motor vehicle seat in the interior of a motor vehicle, comprising a flexible cover material and a flexible sensor device with at least one sensor element that is joined to the cover material and that forms a flexible sensing region of the surface cover.

DE 195 45 168 A1 describes a motor vehicle seat with hollow chambers that can be variably pressurized and that provide lateral support during lateral accelerations.

In contrast, as before there is a need for simple solutions in order to be able to adapt the lateral support in motor vehicle seats to current vehicle states while still enabling simple disembarking.

SUMMARY OF THE DISCLOSURE

According to the invention, it has been recognized that if on recognizing an entry or exit situation, reducing the pressure in the bladder on the door side is not carried out immediately, but the lowering of the pressure in the bladder on the door side is only carried out if there has been a load-related pressure rise in the bladders on the door side, it is possible not only to dynamically adapt the bladder pressure to the driving situation, but also to monitor the pressure that the body of the occupant exerts on the seat or on the lateral fluid bladder in a precisely localized way and to select the same as an approach in order to recognize the actual exiting.

I.e., the bladders on the door side are loaded by the occupants leaning thereon and thereby increasing the pressure therein. Only then will the occupant actually exit and not as soon as the door is opened and/or the ignition is turned off.

The invention therefore enables more accurate determination of exiting.

Monitoring said rise in pressure can be commenced according to the invention when the ignition is turned off and/or the door is opened and/or no change in acceleration is occurring that indicates movement (driving) of the vehicle.

Owing to the network-like arrangement of the sensors, a more accurate picture of the pressure distribution can be produced continuously and then used in order to adjust the fluid pressure in the bladders dynamically. The previously known method and seat only measure the pressure within the bladders selectively.

The invention enables, in particular together with the use of a plurality of smaller bladders instead of a few large bladders, better optimization of the bladder pressure and thereby of the lateral support.

The pressure sensors are preferably fiber optic pressure sensors, with which pressure-induced flexural losses lead to transmission changes in the glass fibers.

The method can additionally provide that in the event of a rise in pressure in the sensors, a pressure increase in the bladders is carried out if the vehicle is in a turn, wherein a pressure increase of the bladder pressure on the outside of the turn is carried out. As a result, the counter pressure is increased and better lateral support is guaranteed. For this purpose, the pressure is determined sensitively and at closely spaced points by the network of pressure sensors, which enables particularly accurate and thereby comfortable results.

The invention also concerns a corresponding motor vehicle seat with a seat surface and with a backrest, with bladders subjected to fluid on the edge in the seat surface and backrest sides, a pressure-controlled fluid source for the bladders, and a controller for the fluid source as well as pressure sensors disposed between the bladders and the seat surface that are connected to the controller. The fluid pressure within the bladders that are subjected to fluid is varied using the pressure signals of the pressure sensors in order to increase or reduce the lateral support. In this manner, the pressure sensors comprise sensors disposed in a grid network and the controller is arranged to trigger lowering of the pressure in the bladder on the door side on recognizing an entry or exit situation; however, the lowering of the pressure in the bladder on the door side is only carried out if a load-related pressure rise has occurred in the bladders on the door side.

In a further embodiment of the invention, the bladders are controllably subjected to fluid (shape-changing elements) by means of a controller, so that the damping properties and the pressure properties while travelling can be adapted to the driving situation and/or the occupant. This can be carried out manually or preferably automatically.

It is useful if the control device takes into account physiological parameters (size, weight, age, gender, etc.) and/or vehicle parameters (masses, stiffnesses, wheel suspension, etc.) and/or driving situation parameters (unevennesses, speed, etc.) and/or seat parameters (for example upholstery, frame), which may be detected by means of sensors, for controlling the shape-changing elements.

It is furthermore conceivable that the controller comprises a memory device. I.e., a personalizing means with seat-memory-adjustment in combination with sensors that record and analyze current parameters is possible. The sensors can, for example, determine accelerations, damper settings, speed, steering angle, and yaw rate, etc. The bladder controller can tap signals from the bus of the vehicle electronics, for example a CAN bus, to which "chassis software" is connected and thus integrated within the vehicle electronics.

According to one aspect of the present disclosure, a method for adjusting a motor vehicle seat includes receiving pressure signals from pressure sensors disposed in a grid network on outside surfaces of edge bladders of the seat. The method further includes raising or lowering a fluid pressure within the edge bladders using the pressure signals, including lowering of the bladder pressure on the door side on recognizing an entry or exit situation only if a load-related pressure rise in bladders on the door side has occurred.

According to another aspect of the present disclosure, a motor vehicle seat includes a seat surface, edge bladders beneath the seat surface, a pressure-controlled fluid source coupled with the bladders, and pressure sensors disposed between the bladders and the seat surface. A controller is coupled with the fluid source and the pressure sensors and causes the fluid source to lower a fluid pressure within at least one bladder disposed on a door side of the seat upon recognizing an entry or exit situation.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
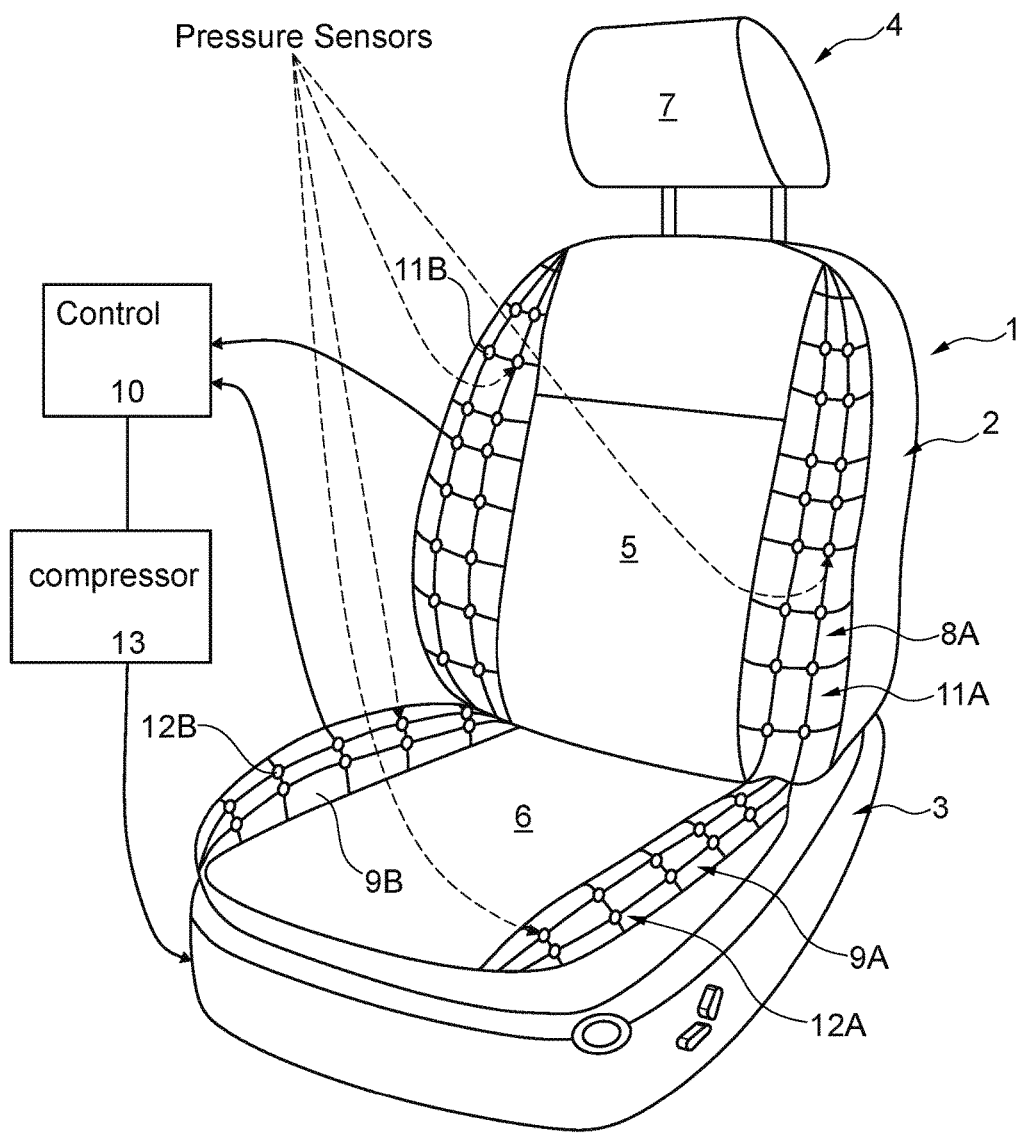
FIG. 1 is a schematic perspective view of a motor vehicle seat according to the invention.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

In FIG. 1, a seat, which is denoted as a whole by 1, of an automobile is shown. The seat 1 includes a backrest 2, a seat surface 3 and a headrest 4, each of which has a supporting surface 5, 6, 7 for the occupant.

The seat 1 further includes lateral upholstery on each edge that improves the lateral support. Said edge upholstery is fitted with pneumatic fluid bladders 8A, B and 9A, B, the pressure of which and thereby the size of which are variable. Each fluid bladder 8A, B and 9A, B include a plurality of chambers that can be individually pressurized.

There is a network of pressure sensors 11A,B, 12A,B disposed between the surface of the bladder and the supporting surfaces 5, 6 of the backrest 2 and the seat surface 3 in each case, wherein fiber optic pressure sensors are used.

There is a controller 10, including the compressed air source compressor 13, for querying the sensors and carrying out the pressure control. The controller 10 can automatically control the air pressure in the fluid bladders 8A, B and 9A,B by specifically pressurizing the individual chambers after analyzing the data originating from the sensors regarding the local pressure and taking into account the driving situation and possibly the passenger characteristics.

Manual control, presetting or intervention in the automatic control is also conceivable.

Figure 2:
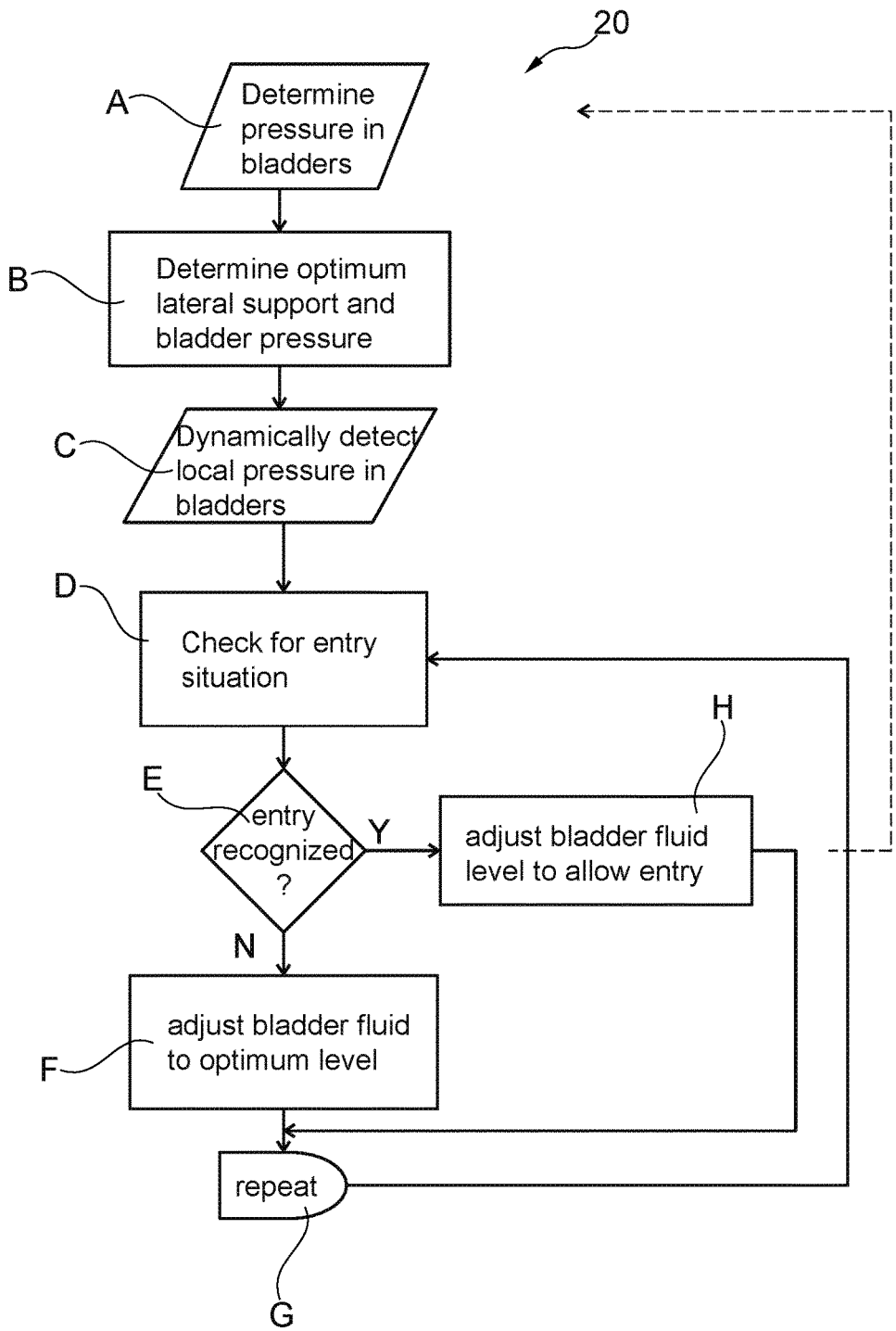
FIG. 2 shows a flow chart of the process of controlling the lateral bladder pressure in a motor vehicle seat according to FIG. 1.

In FIG. 2 the possible process of the control of the pressure in the fluid bladders 8A,B and 9A,B is represented in the form of a flow chart.

Initially (in step A), the vehicle seat 1 carries out a measurement of the occupant and determination of the pressure in the bladders in the static state. This is known in principle.

Then in step B, the optimum lateral support and the pressure necessary for this in the chambers of the fluid bladders 8A,B and 9A,B are calculated in the controller 10 and adjusted by means of the compressor 13. This applies to the static case.

Then, the dynamic detection of the local pressure in the fluid bladders 8A,B and 9A,B by means of the sensors 11A,B or 12A,B starts (step C).

During this, a check is first made by means of a check (step D) of whether an entry or exit situation is recognized (step E), for example, by means of door contact and an increase of the contact pressure on the corresponding bladder on the door side.

If this is not the case, in step F, the optimum lateral support and the pressure necessary for this in the chambers of the fluid bladders 8A,B and 9A,B is calculated in the controller 10 and adjusted by means of the compressor 13. This applies to the dynamic case.

Then the method is repeated following a delay.

If, however, an entry or exit situation is recognized in step E, then in step H the pressure in the corresponding bladders on the door side is discharged in order to enable a comfortable entry or exit. According to the invention, after recognizing the entry or exit situation the pressure reduction is only carried out if in turn a load-related pressure rise has previously been recognized in the corresponding bladder. In this manner, it is clear that the occupant has placed weight on the respective bladder in order to exit or enter, resulting in the pressure rise.

The method may, subsequently, repeat.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for adjusting a motor vehicle seat, comprising:
   using a controller to:
   receive pressure signals from pressure sensors disposed in a grid network on outside surfaces of edge bladders of the seat;
   starting when an ignition of the vehicle is turned off, the door is opened, or no change in acceleration occurs that indicate a movement of the vehicle, monitor for at least one of the pressure signals indicating an increase in the bladder pressure on a door side of the seat; and
   raise or lower a fluid pressure within the edge bladders using the pressure signals, including lowering of the bladder pressure on the door side on recognizing an entry or exit situation only if a load-related pressure rise in bladders on the door side has occurred.

2. The method as claimed in claim 1, wherein the pressure sensors are fiber optic pressure sensors, in which flexural losses induced by pressure result in transmission changes in the glass fibers.

3. The method as claimed in claim 1, wherein in the event of at least one of the pressure signals indicating an increase in pressure, carrying out a pressure increase in at least one of the bladders if the vehicle is in a turn.

4. The method as claimed in claim 3, wherein a pressure increase of the bladder pressure on an outside of the turn is carried out.

5. The method as claimed in claim 1, wherein the fluid pressure within the edge bladders is carried out using a pressure-controlled fluid source and a controller for the fluid source, pressure sensors being connected with the controller.

6. The method as claimed in claim 1, wherein the seat includes a seat surface and a backrest, the edge bladders being disposed within at least one of the seat surface and the backrest.

7. A motor vehicle seat, comprising:
   a seat surface;
   edge bladders beneath the seat surface;
   a pressure-controlled fluid source coupled with the bladders;
   pressure sensors disposed between the bladders and the seat surface; and
   a controller coupled with the fluid source and the pressure sensors causing the fluid source to lower a fluid pressure within at least one bladder disposed on a door side of the seat upon recognizing an entry or exit situation
   wherein the entry or exit situation is identified by monitoring for a signal indicating an increase in the bladder pressure on a door side of the seat when an ignition of the vehicle is turned off, the door is opened, or no change in acceleration occurs that indicate a movement of the vehicle.

8. The motor vehicle seat as claimed in claim 7, wherein the fluid pressure within the bladders is varied using the pressure signals from the pressure sensors in order to increase or reduce a lateral support provided by the edge bladders.

9. The motor vehicle seat as claimed in claim 7, wherein the pressure sensors are disposed in a grid network on the surface of the bladders.

10. The motor vehicle seat as claimed in claim 7, wherein the pressure sensors are fiber optic pressure sensors, in which flexural losses induced by pressure result in transmission changes in the glass fibers.

11. The motor vehicle seat as claimed in claim 7, wherein the controller further carries out a pressure increase in at least one of the bladders if the vehicle is in a turn, in the event of at least one of the pressure signals indicating an increase in pressure.

12. The motor vehicle seat as claimed in claim 7, wherein the controller carries out the pressure increase of the bladder pressure on one of the bladders disposed toward an outside of the turn.

13. The motor vehicle seat as claimed in claim 7, wherein the seat includes a seat surface and a backrest, the edge bladders being disposed within at least one of the seat surface and the backrest.

* * * * *